United States Patent
Billings

(10) Patent No.: US 6,977,106 B2
(45) Date of Patent: Dec. 20, 2005

(54) DECAL BODY ART METHOD AND MEANS

(76) Inventor: Scott Billings, 1209 Foothill Dr., Wheaton, IL (US) 60187

( * ) Notice: Subject to any disclaimer, the term of this patent is extended or adjusted under 35 U.S.C. 154(b) by 21 days.

(21) Appl. No.: 10/391,569

(22) Filed: Mar. 20, 2003

(65) Prior Publication Data

US 2004/0258867 A1   Dec. 23, 2004

(51) Int. Cl.⁷ .................................................. B32B 9/00
(52) U.S. Cl. ................ 428/40.1; 132/319; 132/333; 424/402; 424/443; 428/42.1; 428/201; 428/913
(58) Field of Search .............................. 428/40.1, 42.1, 428/201, 913; 424/402, 443; 132/319, 333

(56) References Cited

U.S. PATENT DOCUMENTS

| | | |
|---|---|---|
| 5,052,418 A | 10/1991 | Miller |
| 5,470,351 A | 11/1995 | Ross et al. |
| 5,652,959 A | 8/1997 | Proctor |
| 5,816,269 A | 10/1998 | Mohammed |
| 5,817,143 A | 10/1998 | Perry |
| 5,836,998 A | 11/1998 | Mueller et al. |
| 5,928,797 A | 7/1999 | Vineberg |
| 5,942,065 A | 8/1999 | Biggs et al. |
| 5,948,502 A * | 9/1999 | Harden ............... 428/99 |
| 6,723,306 B2 * | 4/2004 | Gueret ............... 424/59 |
| 6,730,317 B2 * | 5/2004 | Gueret ............... 424/443 |
| 2002/0110672 A1 | 8/2002 | Muratore-Pallatino |
| 2002/0155069 A1 | 10/2002 | Pruette e al. |
| 2002/0192270 A1 | 12/2002 | Gueret |
| 2003/0026947 A1 | 2/2003 | Pilgian |

* cited by examiner

Primary Examiner—Nasser Ahmad
(74) Attorney, Agent, or Firm—Wood, Phillips, Katz, Clark & Mortimer

(57) ABSTRACT

A decal body art method and means produces a simple adhesive bandage which has a substrate carrying a compound layer consisting of a pressure sensitive adhesive in which is dissolved an artificial tanning agent. The bandage, or its compound layer, is shaped or formed to depict a selected image. The compound layer is covered with a removable release liner. In use, the release liner is removed and discarded. The compound layer is directly adhered to the skin, whereupon a self-tanning image of a rich tan color is formed on the skin of the user.

14 Claims, 1 Drawing Sheet

DECAL BODY ART METHOD AND MEANS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A SEQUENCE LISTING, A TABLE, OR A COMPUTER PROGRAM LISTING COMPACT DISC APPENDIX

Not applicable.

BACKGROUND OF THE INVENTION

This invention relates to the field of decalcomania, or decal, body art, wherein the art of transferring an image containing a picture, pictorial matter or a design, or a composite of both, from a preformed article, can be practiced by applying and transferring the image to a selected location on the epidermis of a human being.

The published application of Gueret US 2002/0192270 A1 dated Dec. 19, 2002 is believed to be the most pertinent prior art reference in that Gueret utilizes an "artificial tanning agent." However, Gueret provides an applicator consisting of an adhesive matrix disposed between at least two layers, both of which are permanently bonded to the matrix. Moreover, Gueret requires that at least one of the layers be permeable to a liquid, for example, water or a liquid containing water and alcohol. The purpose of such permeability is to accommodate the use of a liquid activator since the artificial tanning agent is carried in an anhydrous compound and the usage of a liquid activator is necessitated with his applicator.

BRIEF SUMMARY OF THE INVENTION

An imaging article formed and shaped in a specifically selected design, or carrying a specifically selected picture or pictorial matter, takes the form of a simple adhesive bandage having a removable release liner. The liner is removed and the adhesive bandage is applied by the user to a selected location on the skin of the user. The imaging article has an impermeable substrate carrying a compound consisting of a pressure sensitive adhesive into which an artificial tanning agent such as dihydroxyacetone is dissolved. The article is adhered to the skin and remains in place a sufficient period of time to form a self-tanning image on the skin of the user corresponding to the image of, or on, the article. Such decal body art is accomplished without the use of any liquid or other activators or without the necessity of augmentation by sun or ultraviolet radiation.

DETAILED DESCRIPTION OF THE INVENTION

Figure 1:
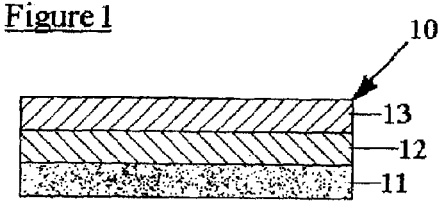
FIG. 1 is an enlarged some-what schematic cross-sectional view of an imaging article provided in accordance with this invention.
Figure 2:
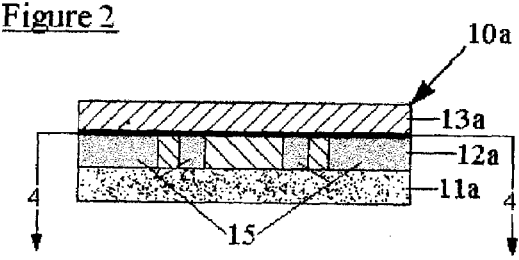
FIG. 2 is a view similar to FIG. 1, but depicting another form of the invention with respect to the placement and formation of the image in the imaging article.
Figure 3:
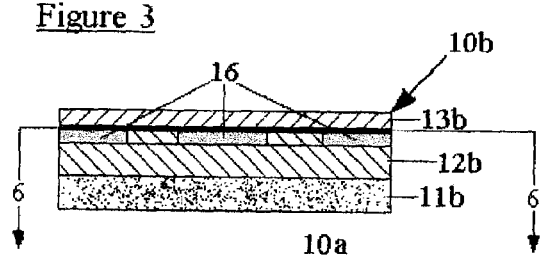
FIG. 3 is a view similar to FIGS. 1 and 2, but depicting yet another form of the invention with respect to the placement and formation of the image in the imaging article.
Figure 5:
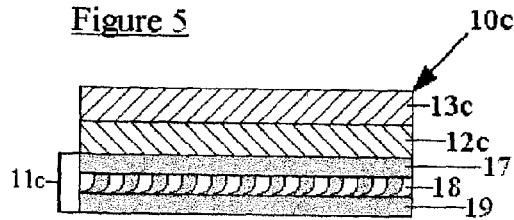
FIG. 5 is a view similar to FIGS. 1–3, but depicting another form of the invention with respect to the details of an alternative form of substrate for the imaging article.

Referring to the drawings, it will be noted that the end product of the present invention consists of an imaging article 10, 10a, 10b, and 10c, each of which physically resembles a simple adhesive bandage consisting essentially of a unitary article having three distinct laminar parts, designated respectively in FIG. 1 at 11, 12 and 13 with counter-parts in FIGS. 2, 3, and 5 designated with like numerals, but with a corresponding suffix letter.

First of all, an impermeable substrate is selected, for example. as shown at 11 in FIG. 1. Then secondly, there is bonded to the substrate 11 a specially formulated compound layer provided to form the center and operatively active core of the imaging article, for example, the compound layer 12 as shown in FIG. 1. Thirdly, the article 10 is completed with the provision of a removable release liner, for example, the release liner 13 as shown in FIG. 1.

Since the imaging article 10 is intended for use in the practice of decal body art, it is desirable that the substrate 11 be made of an impermeable sheet-form material which will protect the user from prematurely, or accidentally, engaging the fingers or the hands of the user with the active core provided by the compound layer 12 of the imaging article 10. In order to accomplish that objective I have found that a suitable substrate 11 can be selected from a relatively widespread class of sheet-form materials that exhibit the requisite degrees of imperviousness. Thus, the substrate 11 can be selected from a group of sheet-form elements which includes polyethylene film, polypropylene film, paper, vinyl film, woven or non-woven fabric, plastic film, and foil or metallic film. The substrate 11 must be sufficiently strong so that it will withstand handling by the user, but sufficiently thin so that it will be entirely flexible and readily conformable to the adjoining portions of the user's body, regardless of the epidermal site chosen by the user for application. Thus, in the various forms of the invention shown in FIGS. 1, 2, and 3, the substrate 11, 11a or 11b is preferably in the range of thickness in the order of from about one (1) to eight (8) mil. By way of example, but not by way of limitation, I have produced satisfactory results with polypropylene film which is available at approximately 0.0030 thickness.

It should be understood that the imaging article 10 can be provided with variations in the formation of the substrate 11. For example, if it is desired to affix an image by printing, it may be desirable to employ a multi-medium substrate as depicted in FIG. 5. In that form of the invention, the substrate is identified generally for purposes of clarity at 11c, merely to distinguish it from the substrates 11, 11a, and 11b.

The substrate 11c comprises three (3) separate layers (not to scale in FIG. 5). A first layer 17 is provided as a layer of paper particularly suitable for bearing a printed image and is placed immediately adjacent the compound layer 12c. A second layer 18 is provided as a layer made of polyethylene and overlies the first layer 17. A third layer 19, also made of paper, covers the second layer 18. The layered construction insures the impermeability of the substrate 11c while accommodating printing techniques.

In accordance with the principles of this invention, a specially formulated compound is provided of which the principal components constitute a pressure sensitive adhesive (PSA) and an artificial tanning agent. There are a number of artificial tanning agents available. However, for purposes of the present disclosure I have selected dihydroxyacetone (DHA) as a typical agent which is reliable in use and which is safe to use and is readily available.

The pressure sensitive adhesive, or PSA, is an acrylic copolymer containing a vinyl acetate monomer suitable for direct contact with the skin of humans. It may be derived from one of the group of water based adhesives, viz, acrylic, vinyl, polyurethane, polyester, latex, rosin ester, and terpene adhesives.

I start the mix with eighty percent (80%) proportion of the PSA. A twenty percent (20%) proportion of the DHA is slowly added under agitation. In terms of proportional limits, I have determined that it is important that the mixture of the compound includes ninety five point five percent to seventy percent (95.5% to 70%) PSA and point five percent to thirty percent (0.5% to 30%) DHA. The mixture is formed at ordinary ambient temperatures and is agitated by stirring until the DHA is thoroughly and completely dissolved with the PSA. Once this step of the process is complete, a satisfactory new compound suitable for practicing this invention has been formed.

The resulting compound is then applied to one side of the substrate 11 to form the compound layer 12 in an amount sufficient to form a thickness of approximately two (2) mil, i.e., a thickness which should be in the order of from about one-half (0.5) mil to six (6) mil. This step of the manufacturing process can be accomplished via any one of a number of coating devices, viz, a coating device selected from a group comprising roll, knife, flex-graphic, silkscreen, rotogravure, and/or rod coating devices.

In applying the compound layer 12 to the substrate 11, it will be understood that this step may be executed by effecting complete coverage of the substrate surface so that a two-element sheet sub-assembly is achieved as depicted in the drawings. Minor alternative changes in the techniques of imaging, or in the provision of one or more of the layers, have been accommodated in this disclosure by describing forms of the invention in the separate figures used to describe the imaging articles 10, 10a, 10 b, and 10c. However, it should be understood that in each instance the basic provisions of a substrate, a compound layer and a release liner are employed.

Figure 4:
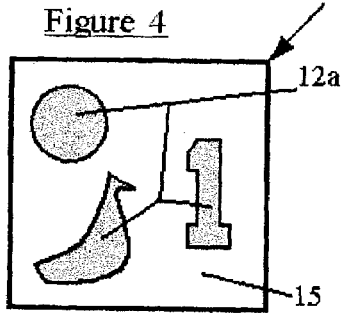
FIG. 4 is a plan view taken on the plane of 4—4 of FIG. 2.

Thus, referring to FIG. 2, the imaging device 10a has a substrate 11a on which suitable blocking means have been utilized so that the compound layer 12a is actually configured in the shape of a selected pattern, or patterns. For example, by printing or overlaying the substrate 11a, or by selectively applying compound with no artificial tanning agent in the areas as shown at 15, the compound layer 12a containing the DHA will provide a pattern or patterns as will be more clearly appreciated by referring to the plane view of FIG. 4 taken on line 4—4 of FIG. 2. On that view, the compound layer 12a is dispersed and spaced within the confines of the imaging article 10a to depict in spaced apart array, a circle, the number "1" and a bird-like figure. The remaining surface area is either empty space, or could be occupied by a physical blocking means 15, or non-tanning agent substance. Thus, the active compound layer 12a and "15" is disposed between the substrate 11a and the release liner 13a.

Figure 6:
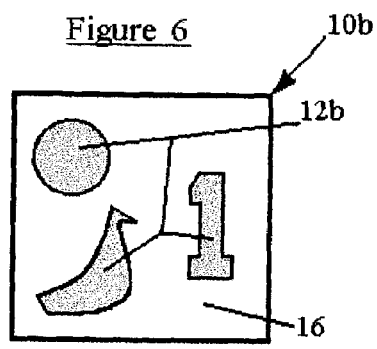
FIG. 6 is a plan view taken on the plane of 6—6 of FIG. 3.
Figure 7:
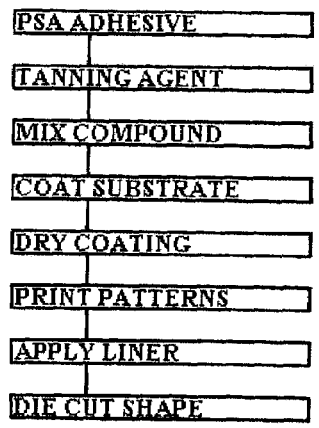
FIG. 7 is a flow chart identifying the steps of manufacture in the production of an imaging article in accordance with the present invention.
Figure 8:
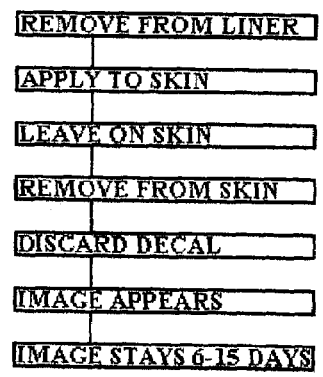
FIG. 8 is a flow chart depicting the steps followed by a user in the use and application of the imaging article of the present invention.

In the form of the invention shown in FIGS. 3 and 6, the imaging article 10b shows a blocking means 16 interposed between the compound layer 12b and the release liner 13b in which the pattern is recessed so that the active compound fills the recesses forming the pattern, or patterns. The plane view of FIG. 6 shows the active compound layer 12b extending into the recesses which are in the form of the circle, the numeral "1" and the bird-like figure.

In accomplishing the imaging as in FIGS. 2–5, it will be understood that the partitioning or blocking means 15 or 16 can be provided, either by a separating element, or by printing, or by a neutral substance containing no active tanning agent, so long as it has sufficient thickness to ultimately control the contact of the active compound layers 12a or 12b with the skin. Thus, each of the active compound layers 12a and 12b will exhibit the requisite image in its operative surface.

Following the formation of the compound layer 12, it is then dried. When sufficiently dry, in order to place the article in condition for marketing and ultimate application by a user, a removable silicone release liner 13, 13a, 13b or 13c is placed over the compound layers 12, 12a–c, respectively. The release liner 13, 13a–c may be anywhere from one (1) to fifteen (15) mil in thickness, depending on how the final form of the imaging device 10, 10a–c is employed. For example, if used in a greeting card format, the liner 13, 13a–c will be in the thicker portion of the range.

Production of the product article as thus far described will produce a sheet-form article which can be placed and temporarily stock piled in roll form. The product can then be die-cut in any of many possible shapes and configurations, or the articles may, if desired be cut into smaller sheets to facilitate packaging so that the ultimate user can exercise the user's own discretion as to the characteristics of the decal body art image to be achieved.

In use, no colorants, pigments or dyes are used or necessitated. The imaging article 10 is simply applied to the skin in the form of decal and can be utilized at home, and with no risk of harm to the body, or to the environment. The end user simply removes the silicone release liner 13 and applies the substrate 11 and the compound layer 12 of the imaging article 10 directly on the skin at any selected and desired locale. No activators need be used, nor are any liquids or liquid activators necessary. The release liner 13 is removed and discarded and the imaging article 10 is applied to the skin. It is retained in place adhesively so that the compound layer 12 is engaged directly in contact with the skin. It remains in place approximately four (4) hours with a full development after eight (8) to ten (10) hours. The image that appears is in the form of a deep rich tan. The tan image will remain visible for six (6) to fifteen (15) days while gradually fading away until the image is no longer visible.

If utilized in sheet-form, the user may cut the imaging article 10 by hand with ordinary cutting instrument such as a scissors into any desired shape and proceed with the application of the imaging article 10 as described.

While minor modifications might be suggested by those versed in the art, it should be understood that I wish to obtain within the scope of the patent warranted hereon all such modifications as reasonably and properly come within the scope of my contribution to the art.

What is claimed is:

1. A decal imaging article for application to the skin of a human being comprising:
   a) a sheet-form substrate,
   b) a compound layer on said substrate carrying an image in, or on, said layer and consisting of a water based pressure sensitive adhesive having an artificial tanning agent dissolved therein,
   and
   c) a removable release liner on said compound layer to facilitate handling of the imaging article without staining the user unintentionally,
   whereby upon removal of the release liner, the user applies the imaging article adhesively to the skin for production of an artificial tanning image without adding any liquid or other activators or without the necessity of augmentation by sun or ultraviolet radiation.

2. A decal imaging article as defined in claim 1 wherein said substrate a) is selected from a group of sheet-form elements consisting of plastic, polyethylene, foil, vinyl, or metallic film, paper and woven or non-woven fabric.

3. A decal imaging article as defined in claim 2 wherein said substrate of a) comprises a combination of more than one of said elements.

4. A decal imaging article as defined in claim 1 wherein said compound layer of b) comprises a pressure sensitive adhesive (PSA) derived from one of the group of water based adhesives consisting of acrylic, vinyl, polyurethane, polyester, latex, rosin ester and terpene adhesives.

5. A decal imaging article as defined in claim 1 wherein said compound layer of b) comprises an artificial tanning agent of dihydroxyacetone (DHA).

6. A decal imaging article as defined in claim 1 wherein said removable release liner of c) comprises a silicone release liner.

7. A decal imaging article as defined in claim 1 wherein the compound layer of b) forms a thickness of no less than approximately two (2) mil and with the range of one-half (0.5) mil to six (6) mil.

8. A decal imaging article as defined in claim 1 wherein the article comprises three layers consisting of two outer layers formed by the release liner and the substrate, and the layer disposed in between the two outer layers comprises active compound and blocking means arranged to define a patterned design to be applied to the skin.

9. A decal imaging article as defined in claim 8 wherein the blocking means comprises a substance containing no artificial tanning agent.

10. A decal imaging article as defined in claim 8 wherein the blocking means comprises a physical means shaped and being of sufficient thickness to form an image in the compound layer.

11. A decal imaging article as defined in claim 1 wherein said substrate is impermeable to protect the user against unintended staining.

12. A ready to use decal imaging article for dry application to the skin of a human being to create a tattoo-like image thereon comprising:
    a) an impermeable, flexible sheet-form substrate,
    b) an active imaging layer on said substrate carrying an image forming material comprising a water-based, pressure-sensitive adhesive with an artificial tanning agent dissolved in the water-based, pressure-sensitive adhesive, said active imaging layer being exposed on said substrate in a predetermined imaging pattern;
    c) a removable release liner sandwiching said active imaging layer against said substrate to facilitate handling of the imaging article without contact with said active imaging layer until said release liner is removed,
    whereby upon removal of said release liner, said imaging article is adhered to skin by said pressure-sensitive adhesive with said dissolved artificial tanning agent against the skin to create said predetermined imaging pattern without adding any liquid or other activators or without the necessity of agmentation by sun or ultraviolet radiation.

13. The ready to use decal imaging article of claim 12 wherein said active imaging layer is configured in said predetermined imaging pattern.

14. The ready to use decal imaging article of claim 12 wherein said active imaging layer consists essentially of a first layer abutting said substrate and including said artificial tanning agent and a second layer located between said first layer and said release liner, said second layer being made of a blocking agent for said artificial tanning agent and outlining said artificial tanning agent.

* * * * *

UNITED STATES PATENT AND TRADEMARK OFFICE
CERTIFICATE OF CORRECTION

| | |
|---|---|
| PATENT NO. | : 6,977,106 B2 |
| APPLICATION NO. | : 10/391569 |
| DATED | : December 20, 2005 |
| INVENTOR(S) | : Scott Billings |

It is certified that error appears in the above-identified patent and that said Letters Patent is hereby corrected as shown below:

Column 6, line 33, delete "agmentation" and substitute therefor --augmentation--.

Signed and Sealed this

Twenty-eighth Day of August, 2007

JON W. DUDAS
*Director of the United States Patent and Trademark Office*